Patented July 27, 1948

2,446,123

UNITED STATES PATENT OFFICE 2,446,123

PREPARATION OF VINYL CHLORIDE

Thomas Boyd, Springfield, Mass., assignor to Monsanto Chemical Company, St. Louis, Mo., a corporation of Delaware No Drawing. Application June 21, 1944, Serial No. 541,457

8 Claims. (Cl. 260—656)

This invention relates to the vapor phase reaction between hydrogen chloride and acetylene. More particularly, this invention relates to the vapor phase reaction of hydrogen chloride with acetylene to form vinyl chloride.

It is an object of this invention to provide a new process for reacting hydrogen chloride with acetylene. A particular object is to provide a new and improved process for preparing vinyl chloride from hydrogen chloride and acetylene.

These and other objects are accomplished according to the present invention by reacting hydrogen chloride in the vapor phase with acetylene, in the presence of a solid complex salt comprising mercuric chloride and cerium chloride. More particularly, it has been found that vinyl chloride may be obtained in high yields by vapor phase reaction between hydrogen chloride and acetylene in the presence of a solid complex salt of mercuric chloride and cerium chloride.

The following example is illustrative of the process according to this invention, but not limitative thereof.

Example I 12.2 grams of cerous chloride and 53.8 grams of mercuric chloride are dissolved in 170 cc. of distilled water acidified with about 4 cc. of concentrated hydrochloric acid. The resulting solution is added to 200 grams of activated charcoal previously dehydrated at 400° C. and at an absolute pressure corresponding to 5 mm. of mercury. The resulting mixture is dried at 110° C. for 8 hours at 50 mm. absolute pressure and then at 175–200° C. for 24 hours at 5 mm. absolute pressure. An iron pipe, about one-half inch in inside diameter and six feet in length is filled with the dried product, which comprises a complex salt of mercuric chloride and cerous chloride deposited on activated charcoal, and is then heated in a circulating oil bath maintained at 100° C. An anhydrous mixture of equimolecular amounts of acetylene and hydrogen chloride gas is passed through the foregoing heated tube at the rate of 600 cc. per minute for each gas, together with from 0.5 to 2 cc. per minute of chlorine gas.

Analysis of the effluent gases shows that the percentage conversion of acetylene to vinyl chloride is initially substantially 100% and even after 300 hours of operation is still about 98.5%. It is to be noted that there is no evidence of reduction of mercuric chloride to mercury or sublimation of mercuric chloride during the reaction. The vinyl chloride obtained as described above may be suitably purified, for example by fractional distillation.

Numerous variations may be introduced into the process of this invention as exemplified in Example I. Thus, while a small amount of free chlorine may be included with the reacting gases, e. g. 0.01–3% of the reactants by volume, the process may be operated for long periods of time without the addition of free chlorine, while at the same time obtaining high yields of vinyl chloride. In place of a reaction tube made from iron, other reaction tubes or chambers may be employed, as for example, tubes made from ferrous materials generally, glazed porcelain, glass and the like. The relative proportions of acetylene and hydrogen chloride may be substantially varied. For example, the use of an excess of hydrogen chloride, such as 5–15% excess serves to reduce the amount of unconverted acetylene to mere traces. However, when desirable an excess of acetylene may be used, for example, up to a three- or four-fold excess.

It may be desirable under certain conditions to employ a reaction tube in which is placed a graduated amount of the catalyst, so that the reacting gases as they pass through the reactor come in contact with an increasing concentration of the catalyst salts. This may be accomplished by employing a reactor in which the amount of the catalyst salt gradually increases from the inlet to the outlet of the reactor, or by employing a series of tubes or other reactors in which the concentration of catalyst is uniform within a single tube, but in which the tubes progressively along the line of vapor travel contain increasing concentrations of catalyst.

In carrying out the reaction according to the process of this invention, the mercuric chloride-cerium chloride catalyst is advantageously deposited on a porous carrier, particularly one having high surface activity. Examples of such carriers are silica gel, activated charcoal, activated alumina, asbestos, diatomaceous earth and the like.

The temperature at which the reaction tube is maintained may be varied substantially from that employed in Example I. Thus, temperatures ranging from 50–250° C. may be used. Generally temperatures in the range 80–150° C. are preferred. Temperatures in the lower portions of the ranges given above are advantageously employed, particularly when the reaction tubes have a relatively large diameter, for example, one inch or over.

It is to be understood that the rate of flow of the gas mixture is not limited to that given in Example I. The particularly rate of flow employed is correlated with such factors as the reaction temperature, size of the reaction chamber, etc., and may vary widely.

When desired, instead of depositing the complex salt on a carrier by evaporation, the salt may be deposited on the carrier by adsorption. This may be accomplished by dissolving the components of the complex in the proper proportions in water that is preferably acidified with hydrochloric acid, adding a suitable amount of a carrier such as dehydrated activated charcoal, allowing the mixture to reach equilibrium, filtering and finally drying the solid product. For example, the components of the complex in the proportions set forth in Example I may be dissolved in about 300 cc. of water that is acidified with about 1.5 cc. of concentrated hydrochloric acid and thereafter 150 grams of dehydrated activated charcoal added. The resulting mixture is then allowed to stand for 15-24 hours to allow the adsorption equilibrium to be attained, filtered and the solid product dried at 110° C. for ten hours, followed by 24 hours at 175-200° C. and 5 mm. absolute pressure.

Another method of preparing the mercuric chloride-cerium chloride catalyst comprises depositing cerium chloride on a carrier such as activated charcoal, then passing mercury vapors through the charcoal until it is saturated therewith and thereafter passing chlorine gas through the treated charcoal at an elevated temperature, for example, 100-200° C. to convert the mercury to mercuric chloride, thereby forming a complex salt of cerium chloride and mercuric chloride in situ.

The catalyst salt employed in Example I comprises the double salt $CeCl_3.4HgCl_2$. However, in carrying out the process of this invention, an excess of either cerium chloride or mercuric chloride may be present, for example, the excess of cerium chloride or mercuric chloride may equal three to four or more times the amount present in the complex salt. Thus, according to one embodiment of this invention, the cerium chloride-mercuric chloride catalyst may contain from 0.1-5% mercuric chloride and 99.9-95% cerium chloride.

It is to be understood that the above description is given by way of illustration only, and not of limitation, and that deviations are possible within the spirit of the invention.

What is claimed is:

1. A process for preparing vinyl chloride which comprises reacting hydrogen chloride in the vapor phase with acetylene, in the presence of a solid complex salt of mercuric chloride and cerium chloride.

2. A process as defined in claim 1 in which a small amount of chlorine is also present during the reaction.

3. A process as defined in claim 1 in which the complex salt is deposited on a carrier.

4. A process as defined in claim 1 in which the complex salt is deposited on a porous carrier.

5. A process as defined in claim 1 in which the complex salt is deposited on a porous material of high surface activity.

6. A process for preparing vinyl chloride which comprises reacting hydrogen chloride in the vapor phase with acetylene, in the presence of a solid double salt of mercuric chloride and cerium chloride deposited on activated charcoal.

7. A process as defined in claim 6 in which from 0.01-3% of chlorine is also present during the reaction.

8. A process for preparing vinyl chloride which comprises reacting hydrogen chloride in the vapor phase with acetylene in the presence of a solid catalyst consisting of a complex salt of mercuric chloride and cerium chloride.

THOMAS BOYD.

REFERENCES CITED

The following references are of record in the file of this patent:

UNITED STATES PATENTS

| Number | Name | Date |
|---|---|---|
| 1,063,007 | Mittasch | May 27, 1913 |
| 1,445,168 | Plauson | Feb. 13, 1923 |
| 1,919,886 | Herrman et al. | July 25, 1933 |
| 1,926,638 | Toussaint | Sept. 12, 1933 |
| 2,183,240 | Jung | Dec. 12, 1939 |
| 2,265,286 | Japs | Dec. 9, 1941 |

FOREIGN PATENTS

| Number | Country | Date |
|---|---|---|
| 99,521 | Switzerland | June 1, 1923 |